(12) United States Patent
Lin et al.

(10) Patent No.: US 11,303,595 B2
(45) Date of Patent: Apr. 12, 2022

(54) METHOD AND DEVICE FOR DISPLAYING TEXT AND VIDEO IN TWO THREADS

(71) Applicant: Sunday Morning Technology (Guangzhou) Co., Ltd., Guangdong (CN)

(72) Inventors: Qianya Lin, Guangdong (CN); Tian Xia, Guangdong (CN); RemyYiYang Ho, Guangdong (CN); Zhenli Xie, Guangdong (CN); Rongchan Liu, Guangdong (CN); Quanze Gao, Guangdong (CN)

(73) Assignee: Sunday Morning Technology (Guangzhou) Co., Ltd., Guangzhou (CN)

( * ) Notice: Subject to any disclaimer, the term of this patent is extended or adjusted under 35 U.S.C. 154(b) by 0 days.

(21) Appl. No.: 16/935,188

(22) Filed: Jul. 22, 2020

(65) Prior Publication Data
US 2021/0320890 A1 Oct. 14, 2021

(30) Foreign Application Priority Data
Apr. 10, 2020 (CN) .......................... 202010283244.0

(51) Int. Cl.
| H04L 29/08 | (2006.01) |
| H04L 51/00 | (2022.01) |
| H04M 1/72439 | (2021.01) |
| H04M 1/72448 | (2021.01) |
| H04L 51/04 | (2022.01) |
| H04L 51/10 | (2022.01) |

(52) U.S. Cl.
CPC .............. *H04L 51/16* (2013.01); *H04L 51/04* (2013.01); *H04L 51/10* (2013.01); *H04M 1/72439* (2021.01); *H04M 1/72448* (2021.01)

(58) Field of Classification Search
CPC ................................ H04L 51/16; H04L 51/10
See application file for complete search history.

(56) References Cited

U.S. PATENT DOCUMENTS

| 2017/0090704 A1* | 3/2017 | Hu ........................ G06F 3/0484 |
| 2020/0183525 A1* | 6/2020 | Liu ........................ G06F 3/1454 |

* cited by examiner

Primary Examiner — Adnan M Mirza (57) ABSTRACT

The present invention discloses a method and device for displaying text and video in two threads. The method comprises: when receiving video message, switching display state of chat interface from sleep state to play state to play the video message on background of the chat interface; in process of playing the video message, responding to user terminal's operation instructions to chat control and/or play control on the chat interface; and at the end of the video message playing, switching the display state of the chat interface from play state to sleep state. The present invention can display text message and video message in two threads on the same operation interface, so that users can get the text message and video message at the same time, and the efficiency of message acquisition can be improved.

12 Claims, 8 Drawing Sheets

Model-View-ViewModel

Figure 8

METHOD AND DEVICE FOR DISPLAYING TEXT AND VIDEO IN TWO THREADS

CROSS-REFERENCE TO RELATED APPLICATIONS

The present application claims the benefit of Chinese Patent Application No. 202010283244.0 filed on Apr. 10, 2020. The contents of the above are hereby incorporated by reference.

FIELD OF THE INVENTION

The present invention relates to the technical field of instant messaging and is more particularly concerned with a method and device for displaying text and video in two threads.

BACKGROUND OF THE INVENTION

With the continuous development of instant messaging application technology, users can chat online with other users through the instant messaging APP installed in the mobile terminal and users can send text, voice, image, video and other messages to each other. In actual application, when the user receives a video message in chat process, the user needs to choose to read text message or play the video message. When the user chooses to read the text message, the user's operation interface is still the chat interface, and at this time, the user cannot play the video message. When the user chooses to play the video message, the user's operation interface will switch from the chat interface to the play interface, and at this time, the user cannot read the text message from the chat interface, and the user can only read the text message after returning to the chat interface by the interruption or end of playing the video message. Since the text message and the video message are respectively displayed in different operation interfaces in the prior art, users cannot acquire text message and video message at the same time, and the efficiency of message acquisition is low.

SUMMARY OF THE INVENTION

To overcome the defects of the prior art, the present invention provides a method and device for displaying text and video in two threads, which can display text message and video message in two threads on the same operation interface, so that users can get the text message and video message at the same time, and the efficiency of message acquisition can be improved.

To solve the above technical problems, the first aspect, one embodiment of the present invention provides a method for displaying text and video in two threads. The method comprises:

when receiving video message, switching display state of chat interface from sleep state to play state to play the video message on background of the chat interface;

in process of playing the video message, responding to user terminal's operation instructions to chat control and/or play control on the chat interface; and at the end of the video message playing, switching the display state of the chat interface from play state to sleep state.

Further, the method for displaying text and video in two threads further comprises:

receiving a request of the user terminal to play the video message, and switching to play the video message when the display state of the chat interface is play state, and when the display state of the chat interface is sleep state, switching the display state of the chat interface from sleep state to play state to play the video message on the background of the chat interface.

Further, that switching display state of chat interface from sleep state to play state specifically is:

inserting video player and the play control into the chat interface and reducing transparency of all the chat controls.

Further, that in process of playing the video message, responding to user terminal's operation instructions to chat control and/or play control on the chat interface comprises:

responding to scrolling operation of the user terminal to scroll control, and scrolling to display text message on the chat interface, wherein the chat control comprises the scroll control.

Further, that in process of playing the video message, responding to user terminal's operation instructions to chat control and/or play control on the chat interface comprises:

responding to click operation of the user terminal to pause control, saving currently paused video frame and pausing to play the video message;

responding to click operation of the user terminal to full screen control, hiding all the chat controls and playing the video message on full screen; and responding to click operation of the user terminal to exit full screen control, unhiding all chat controls and exiting to play the video message on the full screen; wherein the play controls comprise the pause control, the full screen control and the exit full screen control.

The second aspect, one embodiment of the present invention provides a device for displaying text and video in two threads. The device comprises:

module for playing video message, which is configured to switch, when receiving video message, display state of chat interface from sleep state to play state to play the video message on background of the chat interface;

module for responding operation instruction, which is configured to respond, in process of playing the video message, to user terminal's operation instructions to chat control and/or play control on the chat interface; and module for switching display state, which is configured to switch, at the end of the video message playing, the display state of the chat interface from play state to sleep state.

Further, the module for playing video message is further configured to receive a request of the user terminal to play the video message, and switch to play the video message when the display state of the chat interface is play state, and when the display state of the chat interface is sleep state, switch the display state of the chat interface from sleep state to play state to play the video message on the background of the chat interface.

Further, that switch display state of chat interface from sleep state to play state specifically is:

insert video player and the play control into the chat interface and reduce transparency of all the chat controls.

Further, that in process of playing the video message, respond to user terminal's operation instructions to chat control and/or play control on the chat interface comprises:

respond to scrolling operation of the user terminal to scroll control, and scroll to display text message on the chat interface, wherein the chat control comprises the scroll control.

Further, that in process of playing the video message, respond to user terminal's operation instructions to chat control and/or play control on the chat interface comprises:

respond to click operation of the user terminal to pause control, save currently paused video frame and pause to play the video message;

respond to click operation of the user terminal to full screen control, hide all the chat controls and play the video message on full screen; and respond to click operation of the user terminal to exit full screen control, unhide all the chat controls and exit to play the video message on the full screen; wherein the play controls comprise the pause control, the full screen control and the exit full screen control.

Embodiments of the present invention have the following beneficial effects.

By switching, when receiving the video message, the display state of the chat interface from sleep state to play state to play the video message on the background of the chat interface, responding to the user terminal's operation instructions to the chat control and/or play control on the chat interface in the process of playing the video message, and switching the display state of the chat interface from play state to sleep state at the end of playing the video message, displaying of text message and video message on the chat interface in two threads can be achieved. Compared to the prior art, in the embodiments of the present invention, by switching the display state of the chat interface to play state when receiving the video message, text message can be displayed on the foreground of the chat interface and video message can be displayed on the background of the chat interface; and by responding the user terminal's operation instructions to the chat control and/or play control on the chat interface in the process of playing the video message, the user can operate, when the video message is playing, the chat interface according to actual need, thereby text message and video message displayed on the same operate interface in two threads can be realized, the user can acquire text message and video message at the same time, and the efficiency of user's message acquisition can be improved.

DETAILED DESCRIPTION OF THE INVENTION

In the following, the technical solutions in the embodiments of the present invention will be clearly and completely described with reference to the drawings in the embodiments of the present invention. Apparently, the described embodiments are merely a part of the embodiments of the present invention, but not all embodiments. Based on the embodiments of the present invention, all other embodiments obtained by a person of ordinary skill in the art without creative efforts shall fall within the protection scope of the present invention.

It should be noted that the step numbers in the text are only for the convenience of explanation of specific embodiments, and are not intended to limit the order of execution of the steps. The method provided in this embodiment can be executed by a related server, and the following uses the server as an execution subject for illustration.

Please refer to FIGS. 1-7.

Figure 1:
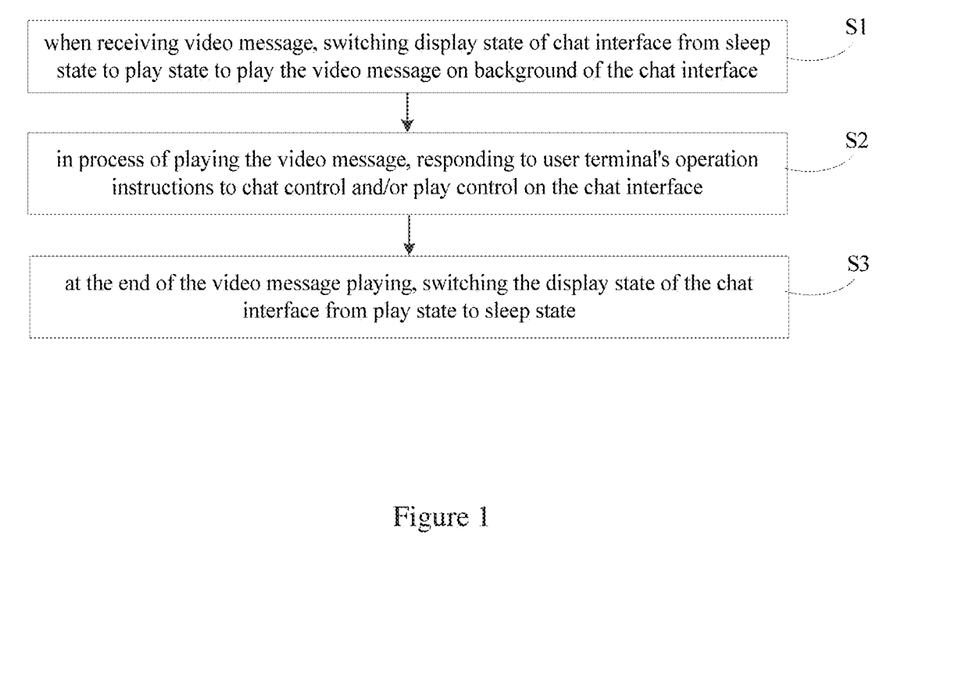
FIG. 1 is a flow diagram of a method for displaying text and video in two threads in the first embodiment of the present invention.

As shown in FIG. 1, the first embodiment provides a method for displaying text and video in two threads. The method comprises steps S1~S3.

S1, when receiving video message, switching display state of chat interface from sleep state to play state to play the video message on background of the chat interface.

S2, in process of playing the video message, responding to user terminal's operation instructions to chat control and/or play control on the chat interface.

S3, at the end of the video message playing, switching the display state of the chat interface from play state to sleep state.

It should be noted that the user terminal includes mobile phones, computers, tablets and other communication devices that can be connected with the server.

Figure 2:
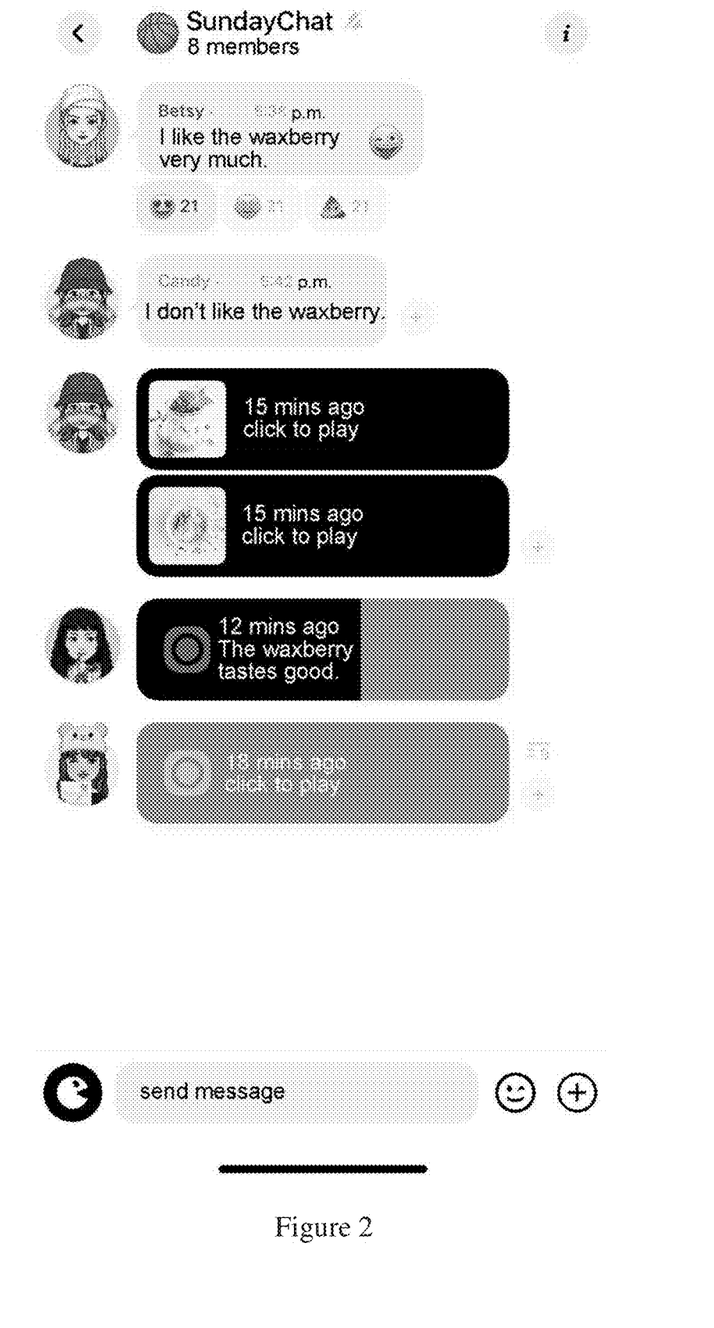
FIG. 2 is a chat interface diagram with the display state which is sleep state in the first embodiment of the present invention.
Figure 3:
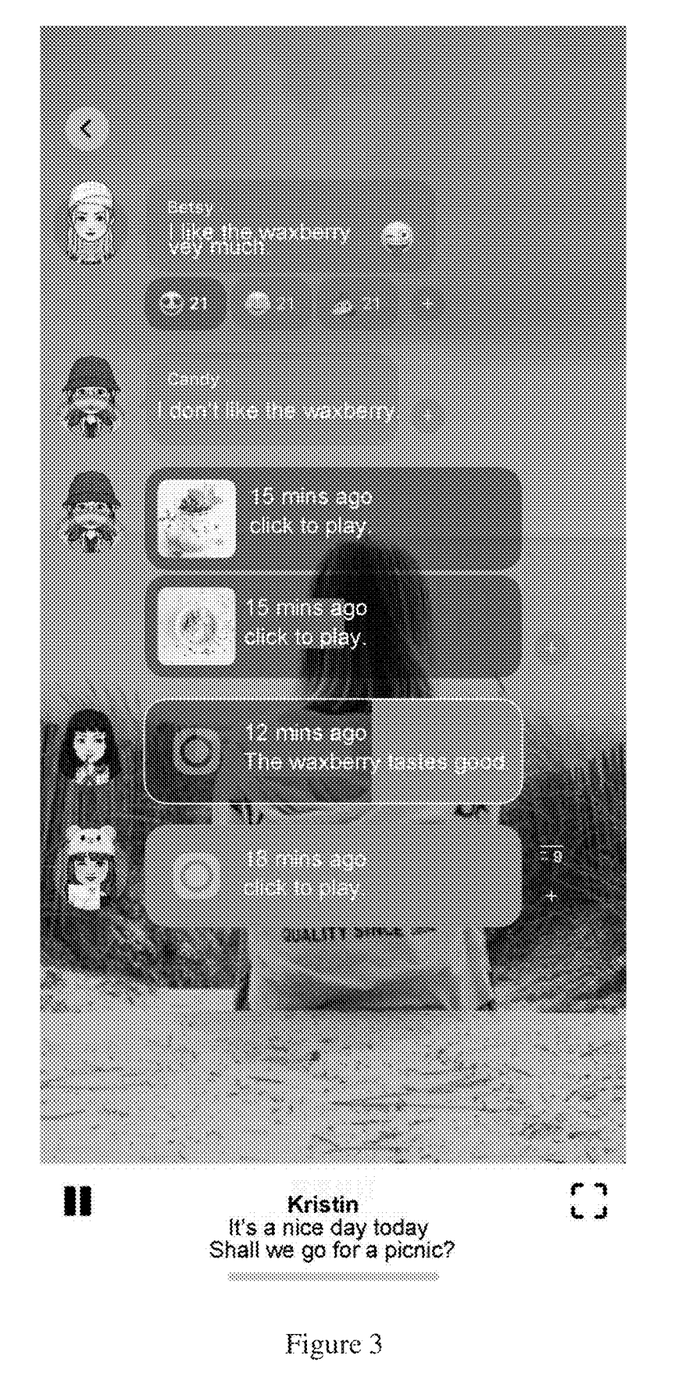
FIG. 3 is a chat interface diagram with the display state which is play state in the first embodiment of the present invention.

Users send and receive messages such as text, voice, image and video on the chat interface through the user terminal. When receiving text, voice and image messages, the display state of the chat interface is sleep state by default. Wherein, the chat interface with the display state which is sleep state is shown in FIG. 2. When receiving a video message, the display state of the chat interface is automatically switched from sleep state to play state to play the video message on the background of the chat interface. Wherein, the chat interface with the display state which is play state is shown in FIG. 3. When the video message is playing, the operation instructions of the user terminal to the chat control and/or play control on the chat interface are responded. When the video message ends playing, the display state of the chat interface is automatically switched from play state to sleep state.

In a preferred implementation of this embodiment, when other video messages are received during playing the video message, the other video messages are added to play queue according to the reception time of the other video messages to sequentially play the video messages.

In this embodiment, by switching, when receiving the video message, the display state of the chat interface from sleep state to play state to play the video message on the background of the chat interface, responding to the user terminal's operation instructions to the chat control and/or play control on the chat interface in the process of playing the video message, and switching the display state of the chat interface from play state to sleep state at the end of playing the video message, displaying of text message and video message on the chat interface in two threads can be achieved. In this embodiment, by switching the display state of the chat interface to play state when receiving the video message, text message can be displayed on the foreground of the chat interface and video message can be displayed on the background of the chat interface; and by responding the user terminal's operation instructions to the chat control and/or play control on the chat interface in the process of playing the video message, the user can operate, when the video message is playing, the chat interface according to actual need, thereby text message and video message displayed on the same operate interface in two threads can be realized, the user can obtain text message and video message at the same time, and the efficiency of user's message acquisition can be improved.

Figure 4:
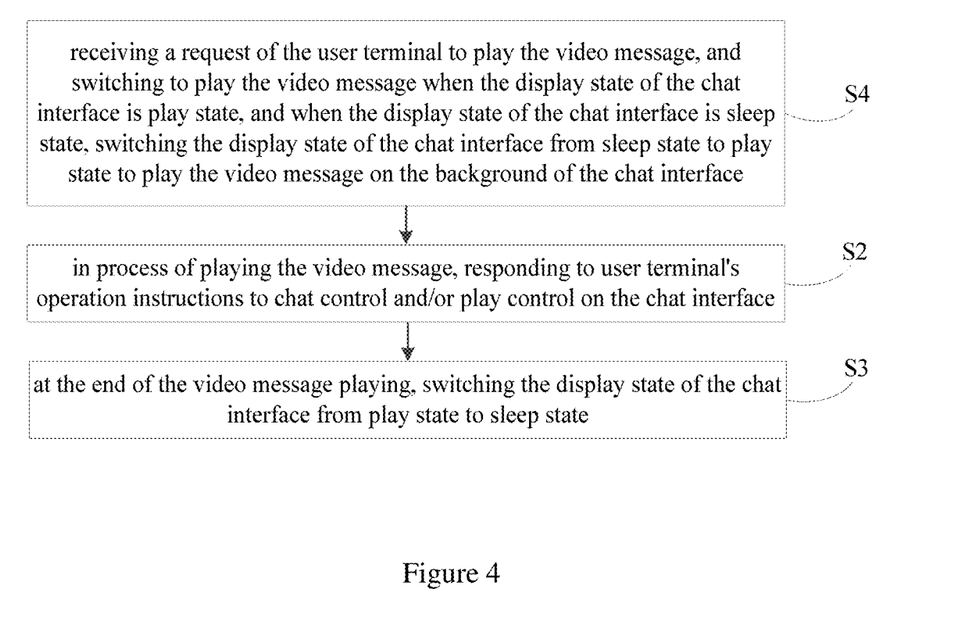
FIG. 4 is a flow diagram of one preferred embodiment in the first embodiment of the present invention.
Figure 5:
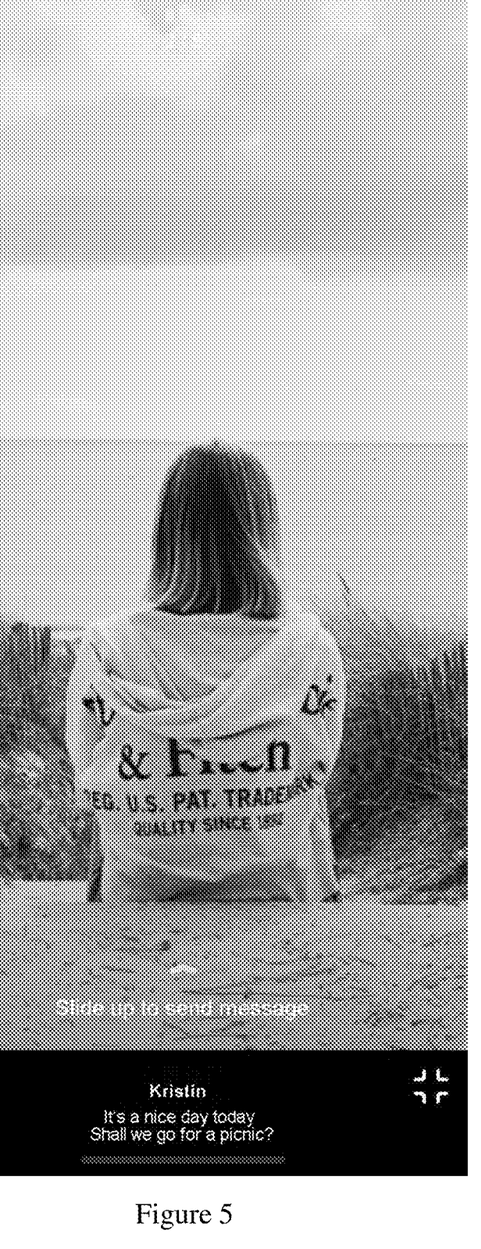
FIG. 5 is a chat interface diagram of playing the video message on full screen in the first embodiment of the present invention.

As shown in FIG. 4, in a preferred embodiment, the method for displaying text and video in two threads further comprises step S4.

S4, receiving a request of the user terminal to play the video message, and switching to play the video message when the display state of the chat interface is play state, and when the display state of the chat interface is sleep state, switching the display state of the chat interface from sleep state to play state to play the video message on the background of the chat interface.

The user selects any video message on the chat interface through the user terminal to initiate the request to play the video message according to the selected video message. When receiving the request of the user terminal to play the video message, the display state of the chat interface is detected, and when the display state of the chat interface is play state, the currently played video message is switched to the selected video message. And when the chat interface is sleep state, the display state of the chat interface is automatically switched from sleep state to play state to play the selected video message on the background of the chat interface.

In this embodiment, by playing the corresponding video message when the request of the user terminal to play the video message is received, the user's need for playing different video message can be achieved, thereby the efficiency of user's message acquisition can be improved.

In a preferred implementation, that switching display state of chat interface from sleep state to play state specifically is that inserting video player and play control into the chat interface and reducing transparency of all chat controls.

In this embodiment, by inserting video player and play control into the chat interface, the video message can be played by the video player, and the operate controls of video player can be provided to the user. By reducing the transparency of all chat controls, the video frame can be displayed clearly.

In a preferred embodiment, that in process of playing the video message, responding to user terminal's operation instructions to chat control and/or play control on the chat interface comprises: responding to scrolling operation of the user terminal to scroll control, and scrolling to display text message on the chat interface, wherein the chat control comprises the scroll control.

In this embodiment, by responding to the scrolling operation of the user terminal to scroll control and scrolling to display text message on the chat interface, the reading needs of the user for different text messages can be achieved, thereby the efficiency of user's message acquisition can be improved.

In a preferred embodiment, that in process of playing the video message, responding to user terminal's operation instructions to chat control and/or play control on the chat interface comprises: responding to the click operation of the user terminal to pause control, saving the currently paused video frame and pausing to play the video message; responding to the click operation of the user terminal to full screen control, hiding all the chat controls and playing the video message on full screen; and responding to the click operation of the user terminal to the exit full screen control, unhiding all chat controls and exiting to play the video message on the full screen; wherein the play controls comprise the pause control, the full screen control and the exit full screen control.

In this embodiment, by responding the click operation of the user terminal to the pause control, the full screen control and the exit full screen control, the user can select the play mode of the video message according to actual need. Wherein, the chat interface of playing the video message on full screen is shown as FIG. 5.

Figure 6:
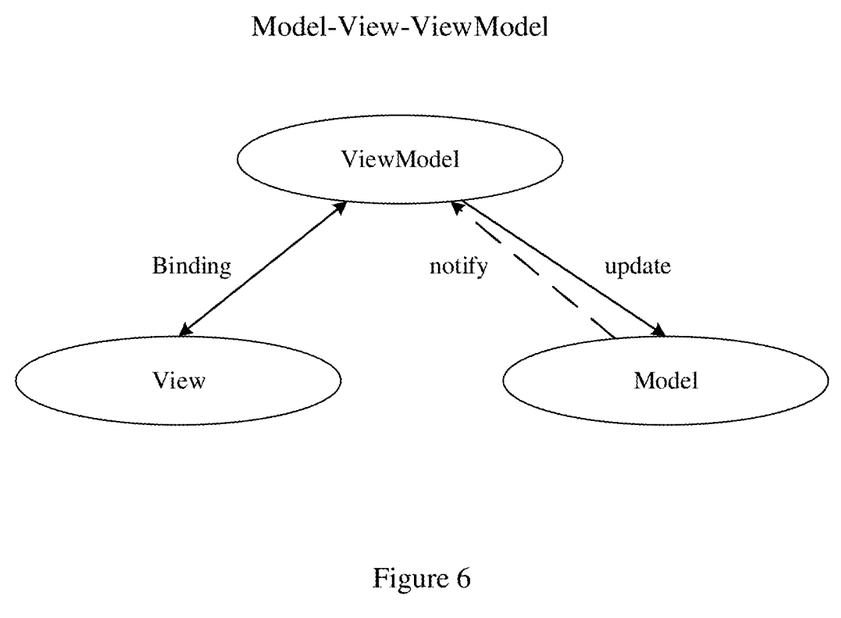
FIG. 6 is an architecture diagram of MVVM+MCV in the first embodiment of the present invention.
Figure 7:
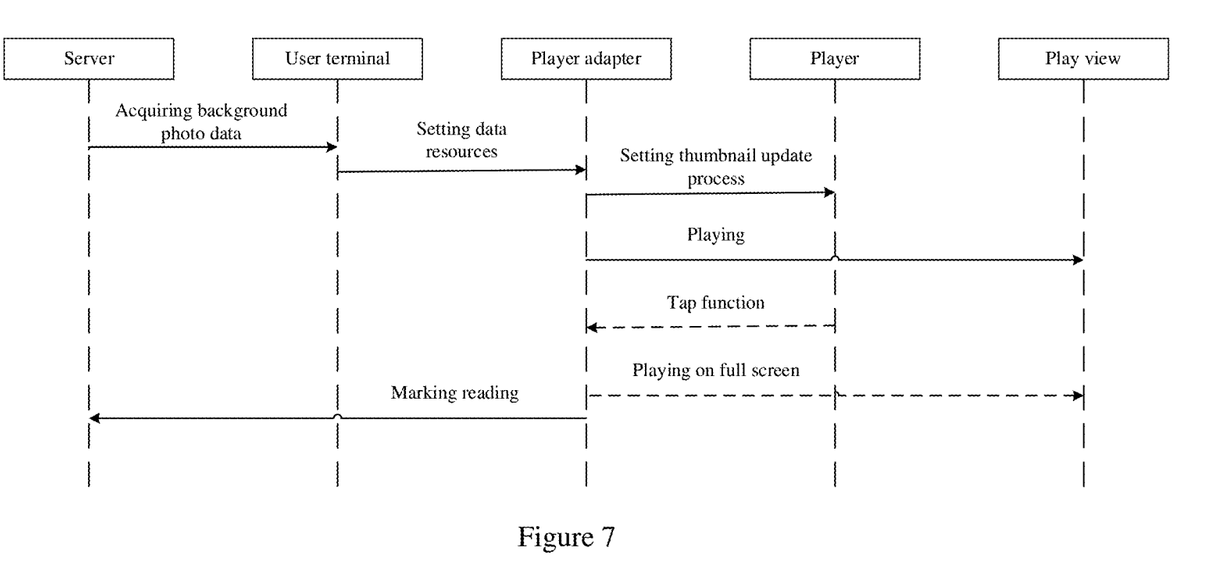
FIG. 7 is a play timing diagram of the background player in the first embodiment of the present invention.

As an example, the method for displaying text and video message in two threads described in the first embodiment is decoupled to the MVVM+MCV architecture. Wherein, the architecture diagram of MVVM+MCV is shown in FIG. 6. When playing the video message, through a one-to-many proxy system informs the UI layer and other logic layers, the effect of gradual in and out is realized. Wherein, the play timing diagram of the background player is shown in FIG. 7.

Figure 8:
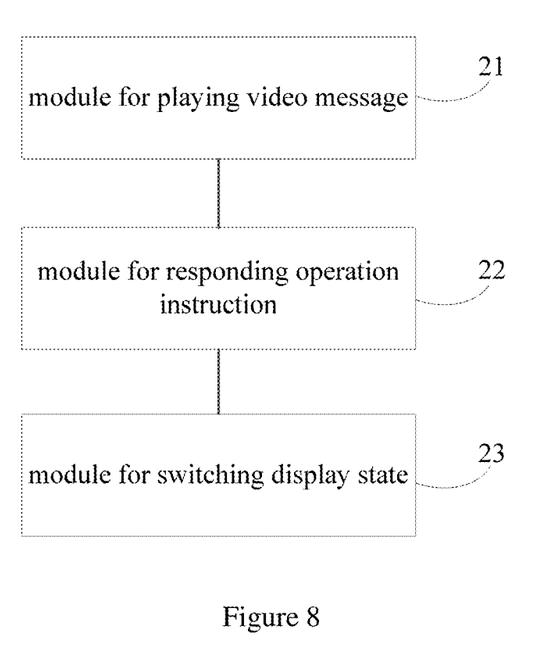
FIG. 8 is a structure diagram of a device for displaying text and video in two threads in the second embodiment of the present invention.

Please refer to FIG. 8.

As shown in FIG. 8, the second embodiment provides a device for displaying text and video in two threads. The device comprises: module for playing video message 21, which is configured to switch, when receiving video message, display state of chat interface from sleep state to play state to play the video message on background of the chat interface; module for responding operation instruction 22, which is configured to respond, in process of playing the video message, to user terminal's operation instructions to chat control and/or play control on the chat interface; module for switching display state 23, which is configured to switch, at the end of the video message playing, the display state of the chat interface from play state to sleep state.

It should be noted that the user terminal includes mobile phones, computers, tablets and other communication devices that can be connected with the server.

Users send and receive messages such as text, voice, image and video on the chat interface through the user terminal. When receiving text, voice and image messages, the display state of the chat interface is sleep state by default. Through the module for playing video message 21, when receiving a video message, the display state of the chat interface is automatically switched from sleep state to play state to play the video message on the background of the chat interface. Through the module for responding operation instruction 22, when the video message is playing, the operation instructions of the user terminal to the chat control and/or play control on the chat interface are responded. Through the module for switching display state 23, when the video message ends playing, the display state of the chat interface is automatically switched from play state to sleep state.

In a preferred implementation of this embodiment, through the module for playing video message 21, when other video messages are received during playing the video message, the other video messages are added to play queue according to the reception time of the other video messages to sequentially play the video messages.

In this embodiment, through the module for playing video message 21, when receiving the video message, switching the display state of the chat interface from sleep state to play state to play the video message on the background of the chat interface; through the module for responding operation instruction 22, in the process of playing the video message, responding to the user terminal's operation instructions to the chat control and/or play control on the chat interface; and through the module for switching display state 23, at the end of playing the video message, switching the display state of the chat interface from play state to sleep state, displaying of text message and video message on the chat interface in two threads can be achieved. In this embodiment, through the module for playing video message 21, when receiving the video message, switching the display state of the chat interface to play state, text message can be displayed on the foreground of the chat interface and video message can be displayed on the background of the chat interface. Through the module for responding operation instruction 22, in the process of playing the video message, responding the user terminal's operation instructions to the chat control and/or play control on the chat interface, the user can operate, when the video message is playing, the chat interface according to actual need, thereby text message and video message displayed on the same operate interface in two threads can be realized, the user can obtain text message and video message at the same time, and the efficiency of user's message acquisition can be improved.

In a preferred embodiment, the module for playing video message 21 is further configured to receive a request of the user terminal to play the video message, and switch to play the video message when the display state of the chat interface is play state, and when the display state of the chat interface is sleep state, switch the display state of the chat interface from sleep state to play state to play the video message on the background of the chat interface.

The user selects any video message on the chat interface through the user terminal to initiate the request to play the video message according to the selected video message. Through the module for playing video message 21, when receiving the request of the user terminal to play the video message, the display state of the chat interface is detected, and when the display state of the chat interface is play state, the currently played video message is switched to the selected video message and when the chat interface is sleep state, the display state of the chat interface is automatically switched from sleep state to play state to play the selected video message on the background of the chat interface.

In this embodiment, through the module for playing video message 21, when the request of the user terminal to play the video message is received, the corresponding video message is played, thereby the user's need for playing different video message can be achieved, and the efficiency of user's message acquisition can be improved.

In a preferred implementation, that switching display state of chat interface from sleep state to play state specifically is that inserting video player and play control into the chat interface and reducing transparency of all chat controls.

In this embodiment, by inserting video player and play control into the chat interface, the video message can be played by the video player, and the operate controls of video player can be provided to the user. By reducing the transparency of all chat controls, the video frame can be displayed clearly.

In a preferred embodiment, that in process of playing the video message, responding to user terminal's operation instructions to chat control and/or play control on the chat interface comprises: responding to scrolling operation of the user terminal to scroll control, and scrolling to display text message on the chat interface, wherein the chat control comprises the scroll control.

In this embodiment, through the module for responding operation instruction 22, responding to the scrolling operation of the user terminal to scroll control and scrolling to display text message on the chat interface, the reading needs of the user for different text messages can be achieved, thereby the efficiency of user's message acquisition can be improved.

In a preferred embodiment, that in process of playing the video message, respond to user terminal's operation instructions to chat control and/or play control on the chat interface comprises: respond to the click operation of the user terminal to pause control, saving the currently paused video frame and pausing to play the video message; respond to the click operation of the user terminal to full screen control, hiding all the chat controls and playing the video message on full screen; and respond to the click operation of the user terminal to the exit full screen control, unhiding all chat controls and exiting to play the video message on the full screen; wherein the play controls comprise the pause control, the full screen control and the exit full screen control.

In this embodiment, through the module for responding operation instruction 22, responding the click operation of the user terminal to the pause control, the full screen control and the exit full screen control, the user can select the play mode of the video message according to actual need.

In the present invention, the module for playing video message, the module for responding operation instruction, and the module for switching display state respectively can be independent one or more processors or processing chips, and if necessary, can also comprise memory and related interfaces, system transmission bus, and the like. The processor executes the code related to the program to realize the corresponding function. In addition, an alternative solution is that the module for playing video message, the module for responding operation instruction, and the module for switching display state in the present invention can also share at least one of the following: digital signal processor, central processor, non-volatile memory, random access memory, system bus and interface. The shared central processor and digital signal processor execute the code related to the program to realize their respective functions. In summary, the embodiments of the present invention have the following beneficial effects.

By switching, when receiving the video message, the display state of the chat interface from sleep state to play state to play the video message on the background of the chat interface, responding to the user terminal's operation instructions to the chat control and/or play control on the chat interface in the process of playing the video message, and switching the display state of the chat interface from play state to sleep state at the end of playing the video message, displaying of text message and video message on the chat interface in two threads can be achieved. In the embodiments of the present invention, by switching the display state of the chat interface to play state when receiving the video message, text message can be displayed on the foreground of the chat interface and video message can be displayed on the background of the chat interface; and by responding the user terminal's operation instructions to the chat control and/or play control on the chat interface in the process of playing the video message, the user can operate, when the video message is playing, the chat interface according to actual need, thereby text message and video message displayed on the same operate interface in two threads can be realized, the user can obtain text message and video message at the same time, and the efficiency of user's message acquisition can be improved.

The above-mentioned embodiments are the preferred embodiments of the present invention. Variations and modifications are allowed within the scope of the invention.

Those skilled in the art will appreciate that the features described above can be combined in various ways to form multiple variations of the invention. As a result, such variations fall within the scope of the protection to the present invention.

A person of ordinary skill in the art can understand that all or part of the processes in the above embodiments can be completed by computer program instructing relevant hardware. The program can be stored in a computer-readable storage medium. During execution of the program, the processes of the foregoing embodiments can be included. Wherein, the storage medium can be a magnetic disk, an optical disk, read-only memory (ROM) or random storage memory (RAM), etc.

The invention claimed is:

1. A method for displaying text and video in two threads, comprising:
   when receiving video message, switching display state of chat interface from sleep state to play state to play the video message on background of the chat interface; when the display state of the chat interface is the sleep state, the chat interface displays received text, voice and image messages; when the display state of the chat interface is the play state, the foreground of the chat interface displays received text, voice and image messages, and the background of the chat interface plays the video message;
   in process of playing the video message, responding to user terminal's operation instructions to chat control and/or play control on the chat interface; and
   at the end of the video message playing, switching the display state of the chat interface from play state to sleep state.

2. The method for displaying text and video in two threads according to claim 1, further comprising:
   receiving a request of the user terminal to play the video message, and switching to play the video message when the display state of the chat interface is play state, and when the display state of the chat interface is sleep state, switching the display state of the chat interface from sleep state to play state to play the video message on the background of the chat interface.

3. The method for displaying text and video in two threads according to claim 1, wherein that switching display state of chat interface from sleep state to play state specifically is:
   inserting video player and the play control into the chat interface and reducing transparency of all the chat controls.

4. The method for displaying text and video in two threads according to claim 2, wherein that switching display state of chat interface from sleep state to play state specifically is:
   inserting video player and the play control into the chat interface and reducing transparency of all the chat controls.

5. The method for displaying text and video in two threads according to claim 1, wherein that in process of playing the video message, responding to user terminal's operation instructions to chat control and/or play control on the chat interface comprises:
   responding to scrolling operation of the user terminal to scroll control, and scrolling to display text message on the chat interface, wherein the chat control comprises the scroll control.

6. The method for displaying text and video in two threads according to claim 1, wherein that in process of playing the video message, responding to user terminal's operation instructions to chat control and/or play control on the chat interface comprises:
   responding to click operation of the user terminal to pause control, saving currently paused video frame and pausing to play the video message;
   responding to click operation of the user terminal to full screen control, hiding all the chat controls and playing the video message on full screen; and
   responding to click operation of the user terminal to exit full screen control, unhiding all chat controls and exiting to play the video message on the full screen; wherein the play controls comprise the pause control, the full screen control and the exit full screen control.

7. A device for displaying text and video in two threads, comprising:
   module for playing video message, which is configured to switch, when receiving video message, display state of chat interface from sleep state to play state to play the video message on background of the chat interface; when the display state of the chat interface is the sleep state, the chat interface displays received text, voice and image messages; when the display state of the chat interface is the play state, the foreground of the chat interface displays received text, voice and image messages, and the background of the chat interface plays the video message;
   module for responding operation instruction, which is configured to respond, in process of playing the video message, to user terminal's operation instructions to chat control and/or play control on the chat interface; and
   module for switching display state, which is configured to switch, at the end of the video message playing, the display state of the chat interface from play state to sleep state.

8. The device for displaying text and video in two threads according to claim 7, wherein the module for playing video message is further configured to receive a request of the user terminal to play the video message, and switch to play the video message when the display state of the chat interface is play state, and when the display state of the chat interface is sleep state, switch the display state of the chat interface from sleep state to play state to play the video message on the background of the chat interface.

9. The device for displaying text and video in two threads according to claim 7, wherein that switch display state of chat interface from sleep state to play state specifically is:
   insert video player and the play control into the chat interface and reduce transparency of all the chat controls.

10. The device for displaying text and video in two threads according to claim 8, wherein that switch display state of chat interface from sleep state to play state specifically is:
    insert video player and the play control into the chat interface and reduce transparency of all the chat controls.

11. The device for displaying text and video in two threads according to claim 7, wherein that in process of playing the video message, respond to user terminal's operation instructions to chat control and/or play control on the chat interface comprises:
    respond to scrolling operation of the user terminal to scroll control, and scroll to display text message on the chat interface, wherein the chat control comprises the scroll control.

12. The device for displaying text and video in two threads according to claim 7, wherein that in process of playing the video message, respond to user terminal's operation instructions to chat control and/or play control on the chat interface comprises:
- respond to click operation of the user terminal to pause control, save currently paused video frame and pause to play the video message;
- respond to click operation of the user terminal to full screen control, hide all the chat controls and play the video message on full screen; and
- respond to click operation of the user terminal to exit full screen control, unhide all the chat controls and exit to play the video message on the full screen; wherein the play controls comprise the pause control, the full screen control and the exit full screen control.

\* \* \* \* \*